Aug. 18, 1925.

P. A. VERWER

PERMUTATION LOCK 1,550,128

Filed Dec. 22, 1922

Inventor-
Pieter Abraham Verwer.
By B. Singer. Atty

Patented Aug. 18, 1925.

1,550,128

UNITED STATES PATENT OFFICE.

PIETER ABRAHAM VERWER, OF UTRECHT, NETHERLANDS, ASSIGNOR OF TWO-THIRDS TO JACOBUS JOHANNES WEFERS BETTINK, OF HUIS TER HEIDE, UTRECHT, NETHERLANDS.

PERMUTATION LOCK.

Application filed December 22, 1922. Serial No. 608,571.

*To all whom it may concern:*

Be it known that I, PIETER ABRAHAM VERWER, citizen of the Kingdom of the Netherlands, and of Dutch nationality, residing in Utrecht, Netherlands, Staalstraat 20, have invented certain new and useful Improvements in and Connected with Permutation Locks, of which the following is a full, clear, and exact specification.

The invention consists of the herein described improved construction of permutation locks and parts connected therewith and relates more particularly to an annular permutation lock or so called letter—or cipher lock, which is especially apt for securing bicycles.

The object of the invention is to construct a lock in a simple and therefore cheap way and still to obtain a lock which gives an efficient protection.

The lock according to the invention is composed of a hollow open or incomplete annular shackle, which can be closed or completed by means of a correspondingly bent sliding-bolt, movable within the canal of the shackle, like the known fixing rings for watch chains; between the sliding bolt and the hollow shackle a number of balls being situated, which serve for bolting the sliding bolt and each for a part engage in a recess in the sliding bolt, the bolting or the disengagement of the sliding bolt being caused with the aid of rotatable marked locking rings which surround the shackle in its transverse direction and each of which has one or more passages or recesses for a ball.

In the form of the invention the balls do not remain continually in their recesses in the sliding bolt and the disengagement of the slide is effected by the fact, that all balls can enter in a radial direction into their respective recesses or cavities in the inner side of each locking ring, as soon as these are turned into the right position, in other positions these rings prevent balls coming out of their recesses in the sliding bolt.

According to the invention each locking ring is of T form in cross-section and so arranged around the annular shackle, that the long leg of the T, which leg at its end is provided with a cavity, is directed towards the locking-bolt; further each locking ring is rotatably enclosed between two guiderings fixed to the shackle, and the bolting action takes place in the centre-plane of each locking ring. The resting place of a yielding ticker- and adjusting ball on the guide ring is in the neighbourhood of the flange of the locking ring and this ball is shut up between a spring and the inner side of that flange, which may be provided with recesses corresponding to the marks on the outside of the locking ring.

According to the invention the sliding bolt is for the greater part preferably made of a tube with open seam, which tube is preferably thus bent, that this seam is situated on the inner side of the tube.

Referring to the accompanying drawings;

Figure 3 is a section on the line B—B in Figure 1, whereas

Figure 1:
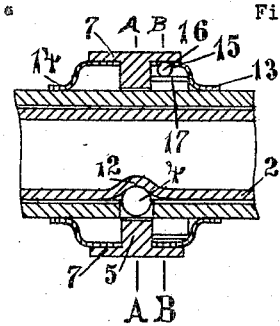
Figure 1 is a longitudinal section of a lock according to the invention.
Figure 3:
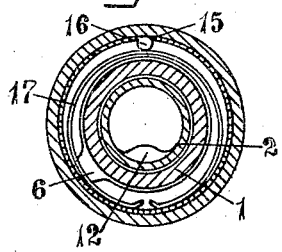
Figure 2:
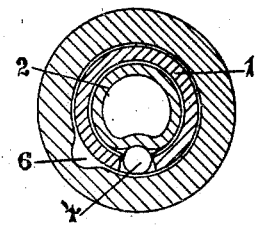
Figure 2 shows a section on the line A—A in Figure 1.
Figure 5:
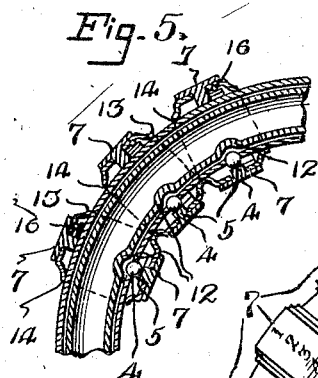
Figure 5 shows a section through the three locking rings of Fig. 4.
Figure 4:
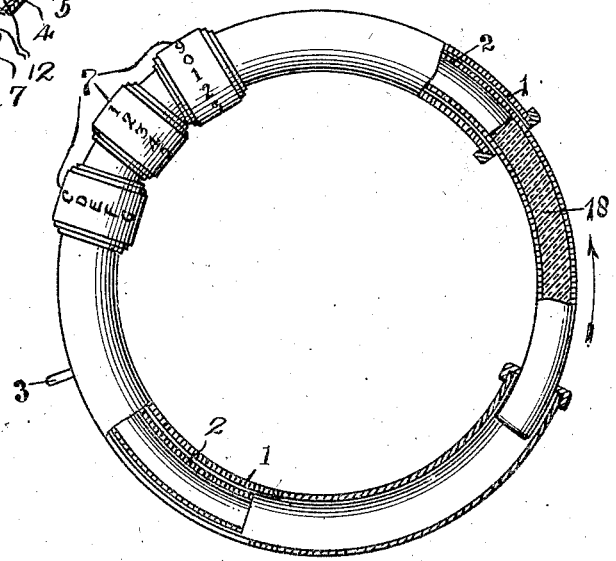
Figure 4 shows the lock in side elevation partly in section.

In the figures the hollow incomplete ring or annular shackle of steel or the like is indicated with the reference number 1, within this open ring or shackle a correspondingly bent sliding-bolt 2 is situated, which can be hollow or solid and also of steel; same can be moved with the aid of a grip 3 and in its outsliden position closes or completes the shackle.

Mounted on a bicycle the spokes pass through this opening.

Between the shackle and the sliding bolt, balls 4 are interposed, which have their place in recesses or cavities 12 which are made in the surface of the sliding bolt 2. The balls prevent the moving of the bolt when one or more locking-rings 5 are in the radial path of the balls.

The recess or cavity for the ball in the end of the long leg of the T-shaped locking ring 5 is numbered 6.

Only when the locking rings are all turned into that position wherein their recess 6 is placed before the appertaining ball 4 can the sliding bolt 2 be moved in or out. The balls are then pressed in a radial direction, by means of the sliding bolt 2, out of their resting places in the bolt into the cavities or recesses 6 in the locking-rings.

The locking rings are in a simple and cheap way rotatably mounted between guide rings 13 and 14 fixed in any suitable way to the shackle.

One of these guide rings possesses an opening 15 for a ticker- or adjustment ball 16, which by a spring 17 is pressed against the inner side of the flange 7 of the locking-ring. The locking ring has in the inner face of that flange cavities for the ticker ball 16, which cavities each as to their position correspond to a definite position of the locking ring.

In the drawing the sliding bolt is a hollow tube; for preventing that the bolt be cut through, there is provided at that end which in closed state of the lock connects the ends of the legs of the shackle a solid piece 18, which can be made of steel or other suitable material.

I claim:

1. A permutation lock consisting of a hollow, open and incomplete annular shackle, a correspondingly shaped sliding bolt movable within the shackle, to close or open the same, and having cavities, balls in said cavities in the sliding bolt and projecting therefrom and retaining and releasing transversely disposed and rotatable permutation locking rings mounted on the shackle, each ring having a recess for a ball.

2. A lock according to claim 1, in which each permutation locking ring is of T-shaped cross-section and is transversely mounted upon the annular shackle, so that the leg of the T is directed towards the sliding bolt, said leg having a recess in its inner periphery, and having two guide-rings, fixed to the shackle, and between which each permutation locking ring is rotatably mounted, one of said guide-rings having a spring-pressed ball arranged for engagement with the recesses in the inner face of the rim of the locking ring, and marks on the outside of the locking ring.

3. A lock according to claim 1, wherein the sliding bolt is for the greater part formed of tube with an open seam and is shaped so that the seam is disposed at the inner periphery.

In testimony whereof, I have signed my name to this specification.

PIETER ABRAHAM VERWER.